Patented Apr. 5, 1938

2,113,370

UNITED STATES PATENT OFFICE 2,113,370

CALCIUM SULPHATE PLASTER

John Stanley Dunn and Francis Robert Himsworth, Norton-on-Tees, and Victor Lefebure, London, England, assignors to Imperial Chemical Industries Limited, a corporation of Great Britain No Drawing. Application June 18, 1936, Serial No. 86,004. In Great Britain June 20, 1935

7 Claims. (Cl. 106—28)

This invention relates to calcium sulphate plasters containing calcium sulphate hemihydrate, e. g. plaster of Paris or mixtures of plaster of Paris with anhydrite.

Calcium sulphate hemihydrate when gauged with water sets too rapidly to be capable of commercial use as a plaster or for the manufacture of moulded articles, and it is usual to retard its rate of setting by the addition of certain substances such as glue and borax.

We have now found that by fusing together one or more metaphosphates of the alkali metals or ammonium, and one or more pyrophosphates of the alkali metals, alkaline earth metals or ammonium, there is obtained a soluble substance which retards the rate of setting of calcium sulphate hemihydrate or of mixtures containing calcium sulphate hemihydrate and anhydrite. The said substance may be used in a ground state in admixture with the plaster or it may be dissolved in the water used to gauge the plaster. A commercially useful retardation may be obtained with widely varying ratios of metaphosphate to pyrophosphate.

In employing the pyrophosphates of the alkaline earth metals the amount used must not be so great that the fused product is not readily soluble. Instead of employing a mixture of metaphosphate and pyrophosphate, a mixture of mono- and di-hydrogen ortho-phosphates may be used as initial material, these being converted by heat into the metaphosphates and pyrophosphates.

It is, of course, not essential to use metaphosphates and pyrophosphates with the same metallic radicle.

By way of illustration the following setting times were obtained by the use of a retarder prepared from sodium meta- and pyrophosphates in varying proportions. With each 100 parts by weight of hemihydrate were mixed 0.3 part of the retarder, and the mixtures were then gauged with 42 parts of water.

| Composition of retarder | | Time for initial set to take place |
|---|---|---|
| Metaphosphate | Pyrophosphate | |
| Percent | Percent | Minutes |
| 80 | 20 | 108 |
| 60 | 40 | 405 |
| 50 | 50 | 345 |
| 40 | 60 | 320 |
| 20 | 80 | 143 |
| 10 | 90 | 39 |

Example 1

A mix suitable for the casting of building blocks is composed as follows. The parts are by weight.

| | Parts |
|---|---|
| Anhydrite | 75 |
| Calcium sulphate hemihydrate | 25 |
| Potassium sulphate | 1 |
| Zinc sulphate ($ZnSO_4 \cdot 7H_2O$) | 1 |
| A retarder consisting of a fused mixture of sodium meta- and pyro-phosphates in the weight ratio of 3:2 respectively | 0.05 |

When this mix is gauged with 46 parts of water, the initial set as measured by the Vicat needle takes place in 4½ minutes, and at the end of ½ hour the mix is sufficiently strong to be handled. The potassium sulphate and zinc sulphate serve, of course, to accelerate the setting of anhydrite in the presence of water.

Example 2

A plaster suitable for purposes other than building blocks and moulded articles, e. g. as a wall plaster, is obtained by suitable choice of the amount of retarder added. Thus by increasing the amount of retarder in Example 1 to 0.125 part a plaster is obtained which when gauged with 34 parts of water, sets in 45 minutes and rapidly hardens to a good wall plaster.

As many apparently widely different embodiments of this invention may be made without departing from the spirit and scope thereof, it is to be understood that we do not limit ourselves to the specific embodiments thereof except as defined in the appended claims.

We claim:—

1. A plaster or plaster mix comprising calcium sulphate hemihydrate and a retarder consisting of a soluble substance obtainable by fusing a metaphosphate selected from the class consisting of the metaphosphates of the alkali metals and ammonium, with a pyrophosphate selected from the class consisting of the pyrophosphates of the alkali metals, alkaline earth metals, and ammonium.

2. A plaster as claimed in claim 1, in which the retarder is prepared from sodium metaphosphate and sodium pyrophosphate.

3. A plaster as claimed in claim 1, in which the retarder is prepared from sodium mono- and dihydrogen orthophosphates.

4. A plaster or plaster mix comprising calcium sulphate hemihydrate, anhydrite, at least one salt capable of accelerating the setting of anhydrite in the presence of water, and a retarder consisting of a soluble substance obtainable by fusing a metaphosphate selected from the class consisting of the metaphosphates of the alkali metals and ammonium, with a pyrophosphate selected from the class consisting of the pyrophosphates of the alkali metals, alkaline earth metals, and ammonium.

5. A plaster as claimed in claim 4, in which the retarder is prepared from sodium metaphosphate and sodium pyrophosphate.

6. A plaster as claimed in claim 4, in which the retarder is prepared from sodium mono- and dihydrogen orthophosphates.

7. A plaster consisting of 75 parts by weight of anhydrite, 25 parts of calcium sulphate hemihydrate, 1 part of potassium sulphate, 1 part of zinc sulphate, and 0.05–0.125 part of a fused mixture of sodium meta- and pyrophosphates in the weight ratio of 3:2 respectively.

JOHN STANLEY DUNN.
FRANCIS ROBERT HIMSWORTH.
VICTOR LEFEBURE.